United States Patent [19]

Goga et al.

[11] 4,141,534
[45] Feb. 27, 1979

[54] OVAL SHAPED VALVE WITH BALANCING PILOT PISTON

[75] Inventors: Atsushi Goga, Kawasaki; Takefumi Ikui, Fukuoka; Mikio Obi; Shinya Kameda, both of Tokyo, Japan

[73] Assignee: Ishikawajima-Harima Jukogyo Kabushiki Kaisha, Ote, Japan

[21] Appl. No.: 708,114

[22] Filed: Jul. 23, 1976

[51] Int. Cl.² ............................................. F16K 31/16
[52] U.S. Cl. ..................................... 251/58; 251/282; 137/219
[58] Field of Search .................... 137/219; 251/282, 58

[56] References Cited
U.S. PATENT DOCUMENTS

| 932,028 | 8/1909 | Koenig | 137/219 |
|---|---|---|---|
| 2,592,474 | 4/1952 | Schnyder | 137/219 |
| 3,032,056 | 5/1962 | Riley et al. | 251/282 X |
| 3,036,587 | 5/1962 | Silver | 137/219 |

Primary Examiner—Arnold Rosenthal
Attorney, Agent, or Firm—Scrivener Parker Scrivener & Clarke

[57] ABSTRACT

A valve is disclosed wherein a valve member is disposed in the chamber of a valve body in such a way that the valve member is axially displaceable so as to open or close the valve, and a pilot cylinder is provided in order to encounter the unbalanced force acting on the valve member due to the difference in pressure between the primary and secondary sides of the valve. When the valve is wide opened, the liquid flows at the same speed, and the pressure loss is reduced to such an extent as almost equal to the pressure loss of a gate valve in wide opened position.

2 Claims, 11 Drawing Figures

OVAL SHAPED VALVE WITH BALANCING PILOT PISTON

DETAILED DESCRIPTION OF THE INVENTION:

The present invention relates to a valve.

In order to control the liquid flow in the piping system in a process plant or the like, various types of valves such as single-port valves, double-port valves, butterfly valves and so on are used. With the increase in size of a plant and the resultant increase in flow rate in the piping system both the size and the number of valves used are increased. In order to save labor required for the plant operations, automatic control valves have been used. In general, manually operated valves are installed on both sides of each automatic control valve in order to facilitate the inspection and maintenance. Moreover the orificess are installed in order to measure the flow rate. As a result, the pressure loss in the piping system including valves is considerably increased so that the size of the pipes used must be increased in order to reduce the power required for forcing the liquid to flow. Therefore, in order to reduce the size of a plant and to attain the savings in labor, the valves with the minimum valve loss must be used so that the pipes with smaller nominal sizes may be used, and the valves which can be both manually and automatically operated must be used so that the types of the valves used in the plant may be minimized.

The manually and automatically operated valves available in the market now are, in general, single-port valves, double-port valves, butterfly valves and so on. In FIG. 1 there is shown one example of conventional single-port globe valves. It comprises a valve body a with a valve seat b and a valve member or disk c and a valve actuator operatively coupled to the disk c. The passage or variable orifice defined between the disk c and the valve seat b controls the flow rate of the liquid flowing from an inlet port in the left side flange e and flowing out of an outlet port in the right side flange f as indicated by the arrows. The prior art globe valve of the type shown in FIG. 1, however, has some defects to be described below.

(a) First, in the valve used in the pipe system, the direction of the liquid flow is changed ($180° = \theta_1 + \theta_2$ in FIG. 1) so that even when the valve is in the opened position, there is a great valve loss. Therefore the nominal size of the pipes used must be increased.

(b) Secondly, when the valve is in the shutoff position, no liquid leaks from the primary or upstream side to the secondary or downstream side so that when the valve is moved from the completely closed position to the slightly opened position or when the valve is shut off, considerably great power is required in order to overcome the unbalanced force acting on the valve member or disk c due to the difference in pressure between the upstream and downstream sides. Consequently, large valve actuators are required. In addition to the above problems, in the double-port type or butterfly type automatic control valves, leakage occurs through the contact surfaces between the sliding parts and split body sections even when the valves are completely closed so that the plant operation is adversely affected.

The present invention was made to overcome the above and other problems encountered in the prior art valves, and has its object to provide valves which may be automatically and/or manually operated, which are normally shut off but in case of an emergency rapidly opened and which valves may be used in various fields such as chemical plants, nuclear power plants, electric power generating plants, water utility plants, LNG storage centers, vessels and so on.

The present invention will become more apparent from the following description of some preferred embodiments thereof taken in conjunction with the accompanying drawings, in which.

Figure 1:
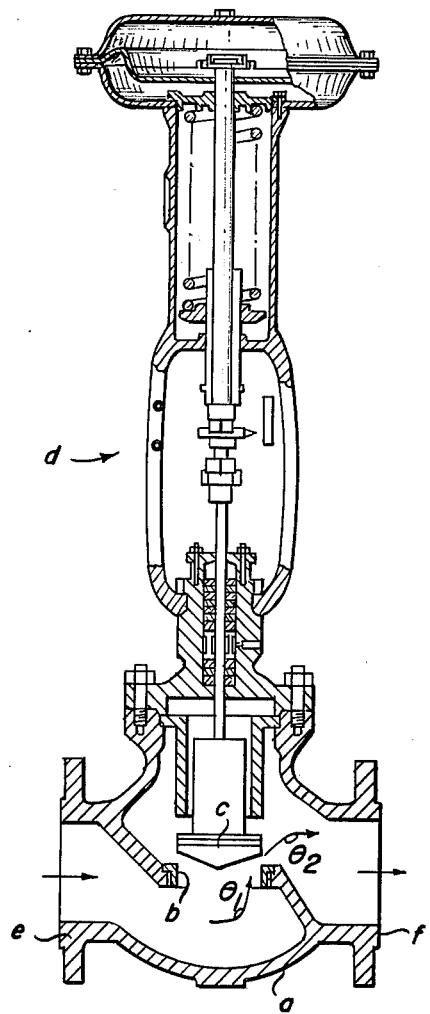
FIG. 1 is a sectional view of a prior art globe valve.

In FIGS. 2 through 6 there is shown the first embodiment of the present invention which may be used as either a manually or automatically controlled valve.

The valve body consists of two split sections 1 and 2, and the oval-shaped valve member 3 in the chamber of the body section 1 is such that when the valve member 3 is moved away from the valve seat 6 in the valve body section 2, the fluid flowing into the primary side A through the inlet port as indicated by the arrow flows along the whole surface of the oval-shaped valve member 3 between the space between the member 3 and the body section 1 without causing any turbulence and through the passage defined between the valve member 3 and the valve seat 6 into the secondary or downstream side B in the body section 2.

Figure 3:
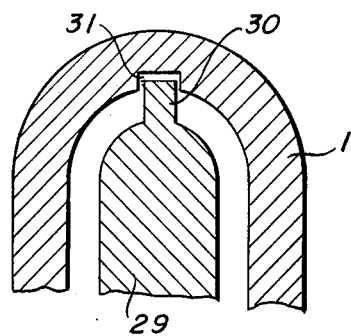
FIG. 3 is a sectional view taken along the line XII—XII of FIG. 11.
Figure 4:
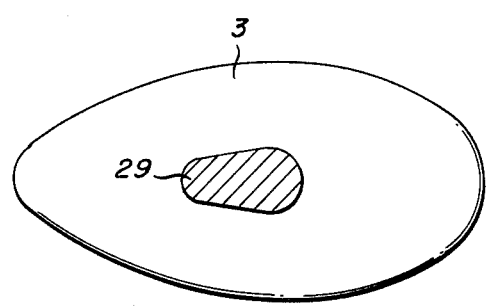
FIG. 4 is a sectional view taken along the line XIII—XIII of FIG. 11.

In the first embodiment, the oval-shaped valve member 3 is carried by an arm 29 which is formed integral with the valve member 3, extended upwardly, has a cross sectional configuration similar to that of an air foil as best shown in FIG. 4 and is terminated into a guide projection 30 which is slidably fitted into an axial guide groove formed in the top inner wall of the body section 1 as best shown in FIG. 3 so that the rotation of the valve member 3 may be prevented when it is selectively moved between the tightly closed position and the wide open position as will be described hereinafter.

Figure 2:
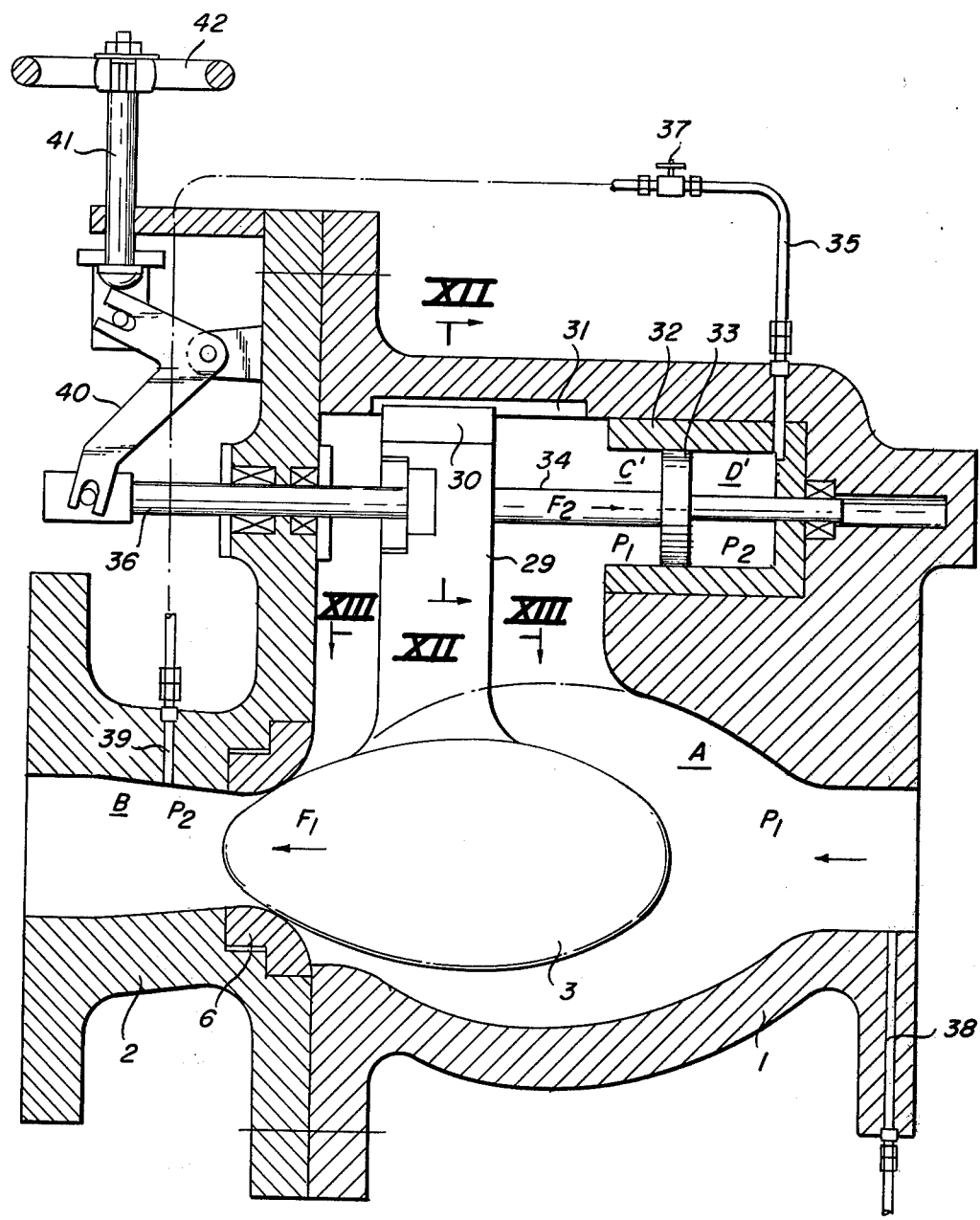
FIG. 2 is a sectional view of a first embodiment of the present invention, the valve being manually operated.

The body section 1 is provided with a horizontal pilot cylinder 32 with a pilot piston 33 slidably disposed within the bore thereof. The arm 29 of the valve member 3 is carried by a piston rod 34 of the pilot piston 33. The space C' on the left side of the pilot piston 33 in the pilot cylinder 32 is communicated with the valve chamber of the body section 1 while the space D' on the right side of the pilot piston 33 is communicated with the secondary side B in the body section 2 through a balance tube 35 including a shutoff valve 37 which is closed when the valve member 3 is in the shutoff position in order to prevent the leakage from the space D' to the secondary side B. Therefore, irrespective of the position of the valve member 3, the pressure in the space C' is always equal to the pressure $P_1$ on the primary or upstream side A while the pressure in the space D' is equal to the pressure $P_2$ on the secondary side B. When the oval-shaped valve member 3 is in the shutoff position or is pressed against the valve seat 6, the resultant unbalanced force $F_1$ acts on the valve member 3 as shown in FIG. 2 due to the difference in pressure between the primary and secondary sides A and B, but the force $F_2$ acting on the pilot piston 33 due to the difference in pressure in the pilot cylinder 32 encounters the balanced force $F_1$. Since the arm 29 of the valve member 3 is carried by the piston rod 34, the valve member 3 is axially or horizontally moved toward or away from the valve seat 6 when the pilot piston 33 is displaced in the pilot cylinder 32 to the left or right.

Figure 11:
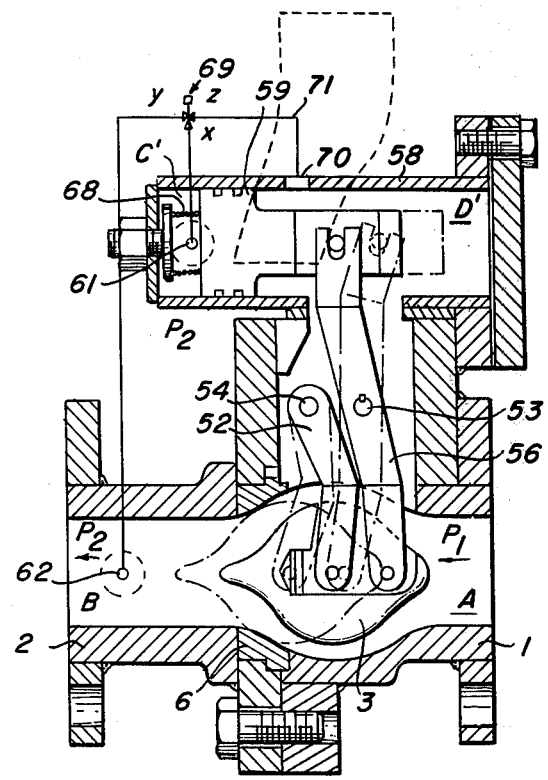
FIG. 11 is a view similar to FIG. 7 but illustrating the valve which is used as an emergency shutoff valve.

When the valve member 3 is moved away from the valve seat 6 to the open position, the liquid flows along the surface of the oval-shaped valve member 3 at the same speed through the space between the valve member 3 and the body section 1 without causing any turbulence and through the passage between the valve member 3 and the valve seat 6 into the valve body section 2 or the secondary side B as indicated by the arrows in FIG. 11. Since the valve member 3 is oval-shaped and the body section 1 has also an oval-shaped chamber, the liquid flows along the meridians of the oval-shaped valve member 3 and uniformly over the whole surface thereof so that the pressure loss in the valve may be minimized and consequently the valve loss may be reduced to the minimum. The cross sectional configuration similar to that of an air foil of the arm 29 also serves to minimize the pressure loss and hence the valve loss.

Since the valve member 3 is oval-shaped, the alignment thereof with the valve seat 6 is much facilitated and consequently the valve member 3 is precisely pressed against the seat valve 6. That is, the valve member 3 can be precisely brought to and held in the shutoff position. In this case, due to the difference in pressure between the primary and secondary sides A and B, the resultant unbalanced force $F_1$ acts on the valve member 3 as shown in FIG. 2. In the first embodiment the pressure in the space C' on the left side of the pilot piston 33 in the pilot cylinder 32 is always equal to the pressure $P_1$ on the primary side A while the pressure in the space D' on the right side of the pilot piston 33 is also equal to the pressure $P_2$ on the secondary side B so that the force $F_2$ is produced due to this pressure difference and acts upon the pilot piston 33 tending it to be displaced to the right. This force $F_2$ acts in the direction opposite to the direction of the resultant unbalanced force $F_1$ acting on the valve member 3 in the shutoff position. As a result, only a little power is required for moving the valve member 3 from the shutoff position to the open position. More particularly, when a little power is applied to a valve rod 36 in the axial direction toward the right in FIG. 2, the valve member 3 is readily moved away from the valve seat 6. Same is true when the direction of the liquid flow is reversed because of the reason described above. More particularly as shown in FIG. 2 pressure sensing and admitting ports 38 and 39 are drilled through the body sections 1 and 2 and hydraulically connected to pressure gages means (not shown) so that the pressure $P_1$ and $P_2$ on the primary and secondary sides A and B may be detected and the flow rate may be measured in the conventional manner from the difference between the pressures $P_1$ and $P_2$.

Figure 5:
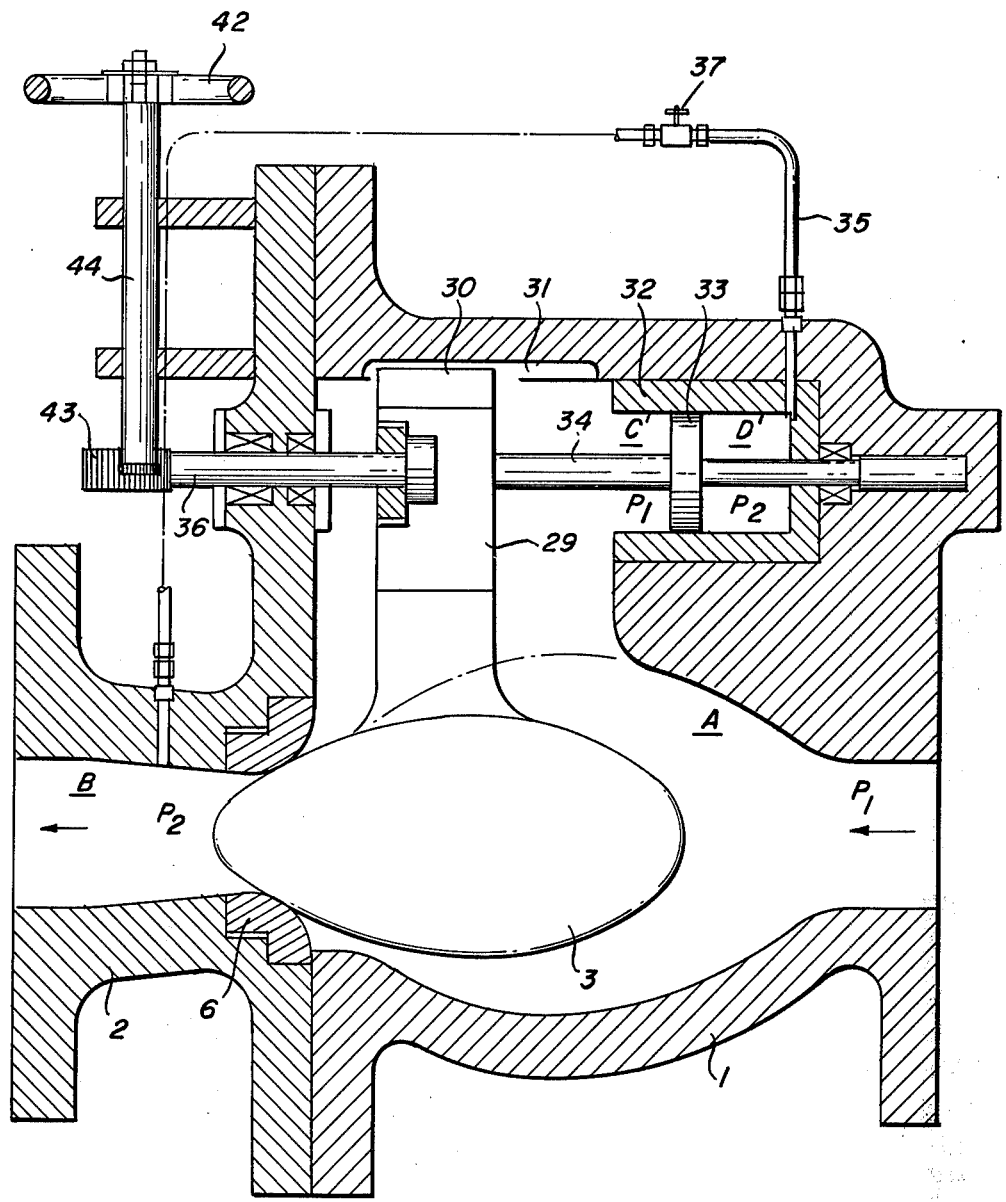
FIG. 5 is a view similar to FIG. 11 but illustrating another type of a manually operated valve.
Figure 6:
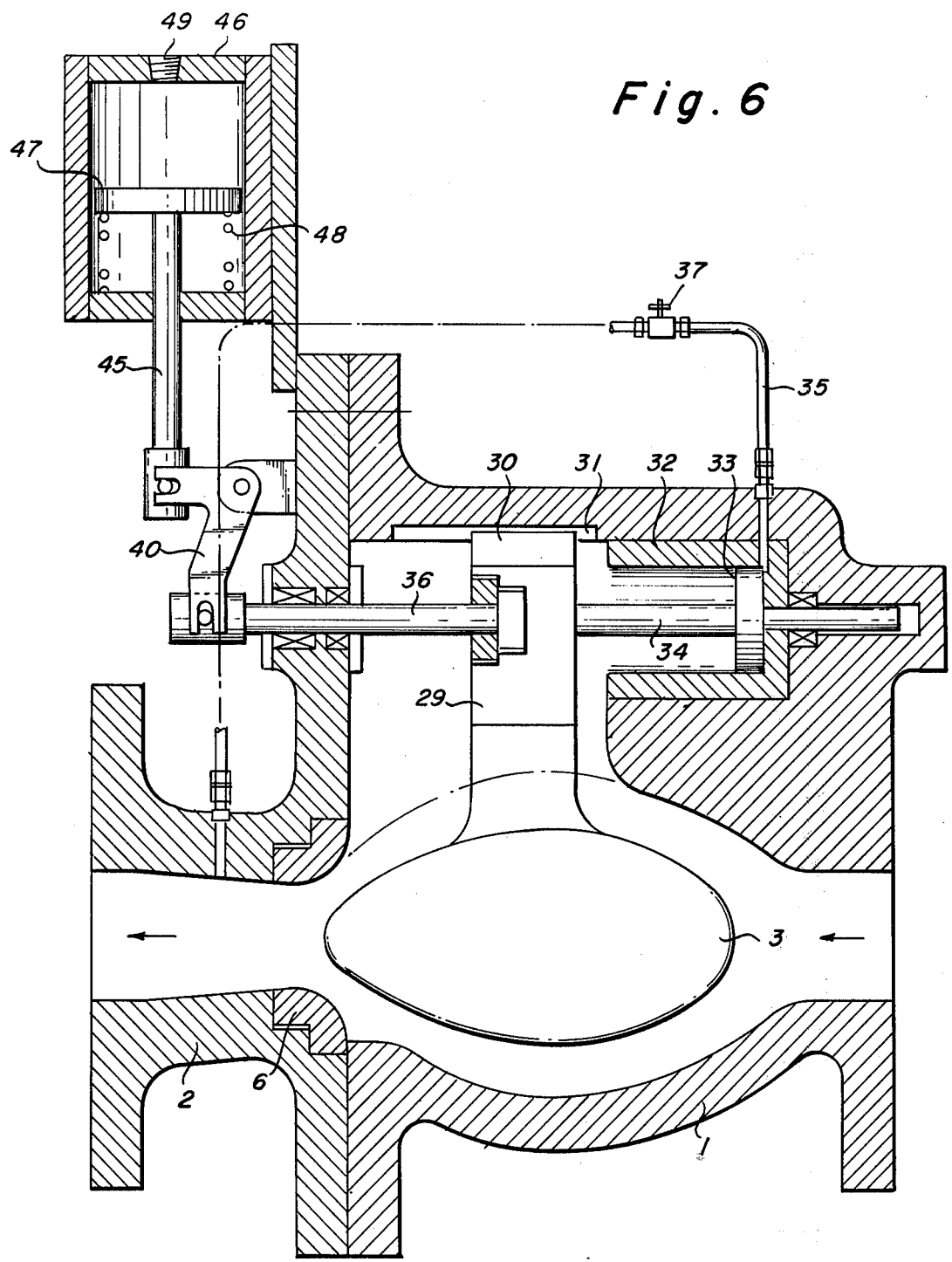
FIG. 6 is a view similar to FIG. 11 but illustrating the valve which is automatically operated.

The valve of the first embodiment may be used as a manually operated valve as shown in FIG. 2 or 5 or as an automatic control valve as shown in FIG. 6.

In case of the manually operated valve shown in FIG. 2, a bell crank 40 which is suitably pivoted to the body section 2 has their upper and lower ends operatively connected to the lower end of a spindle 41 of handwheel 42 and to the free end of the valve rod 36, respectively. Therefore upon rotation of the handwheel 42, the valve member 3 may be moved toward or away from the valve seat 6.

In the manually operated valve shown in FIG. 14, the free end portion of the valve rod 36 is externally screw threaded in the form of a rack 43 in mesh with a pinion carried at the lower end of the spindle 44 of the handwheel 42. Therefore the rotation of the handwheel 42 in either direction causes the movement of the valve member 3 toward or away from the valve seat 6. In both the manually operated valves of the types shown in FIGS. 2 and 5, only a little effort is required to move the valve member 3 from the shutoff position to the slight opened position or to the wide open position.

In the automatic control valve shown in FIG. 6, the valve rod 36 is operatively coupled through the bell crank 40 to the lower end of the piston rod 45 of a piston 47 of a valve actuator 46. The valve actuator 46 may be either the pneumatic or hydraulic type depending upon a control system to be employed and may be easily mounted on the valve. In FIG. 6, the valve actuator 46 is of the spring loaded piston type in which a coiled spring 48 is loaded between the piston 47 and the bottom of the actuator 46 so that the piston 47 may be normally biased upwardly and consequently the valve member 3 may be moved toward or pressed against the valve seat 6. In response to the pressure of the working air or oil introduced into the valve actuator 46 through an inlet port 49 into the space above the piston 47, the opening area of the passage between the valve member 3 and the valve seat 6 may be determined.

In FIGS. 7-11, there is shown the second embodiment of the present invention which may be used as a manually operated valve, automatic control valve, automatic relief valve or automatic shutoff valve.

Figure 7:
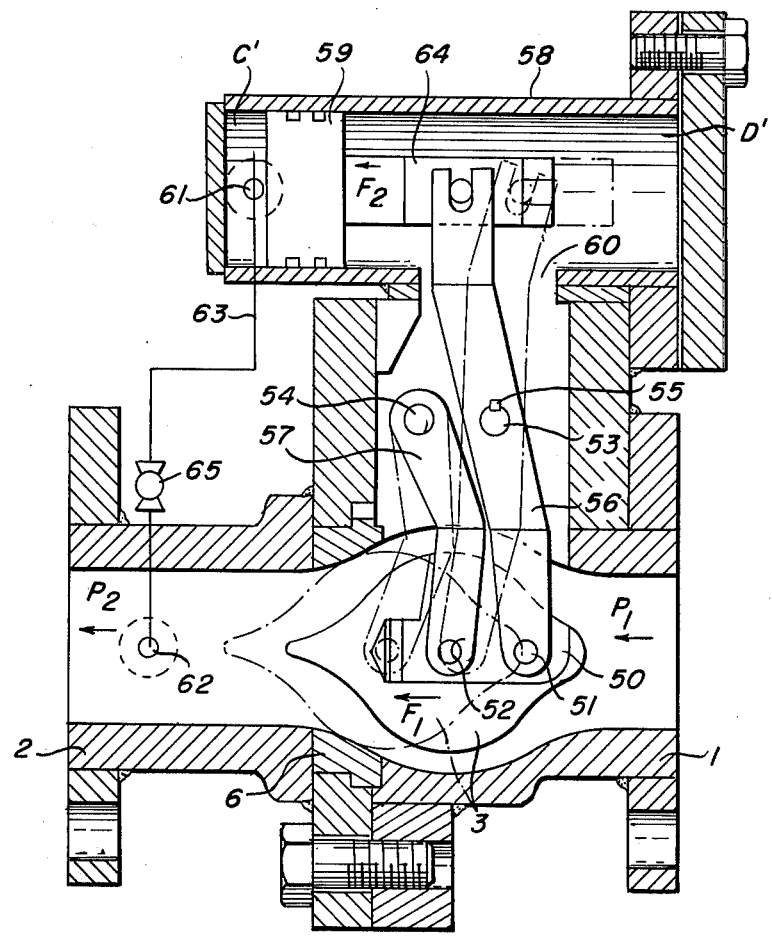
FIG. 7 is a sectional view of a second embodiment of the present invention, the valve being manually operated.

Whereas in case of the first embodiment, when the oval-shaped valve member 3 in the chamber of the body section 1 is moved away from the mating valve seat 6 in the body section 2, the liquid flows from the primary side A along the whole surface of the oval-shaped valve member 3 in the space between the member 3 and the body section 1 and through the space between the valve member 3 and the valve seat 6 without causing any turbulent flows into the secondary side B. The valve member 3 is modified as will be described below. As shown in FIG. 7, a core member 50 which is inserted into the cavity in the valve member 3 and securely held thereto has an upwardly directed recess, and the lower end of a driving lever 56 whose midpoint is pivoted with a pin 53 to the body section 1 and keyed with a key 55 to the pin 53 is inserted into the recess of the core member 50 and pivoted thereto with a pin 51. The upper end of a follower lever 57 is pivoted to the body section 1 with a pin 54 axially horizontally spaced apart from the pin 53 while the lower end is inserted into the recess of the core member 50 and pivotably fixed thereto with a pin 52 axially horizontally spaced apart the pin 51 by a suitable distance. Therefore the valve member 3 is axially movably carried by the driving lever 56 and the follower lever 57.

A horizontal pilot cylinder 58 with a pilot piston 59 slidably fitted in the bore thereof is mounted on the tops of the body sections 1 and 2, and the space D' on the right side of the piston 59 in the pilot cylinder 58 is hydraulically communicated with the primary side A through a balance port or opening 60 formed through the wall of the pilot cylinder 58. The upper end of the driving lever 56 is extended through this balance port or opening 60 into the pilot cylinder 58 and is operatively coupled to a piston rod 64 of the pilot piston 59. The space C' on the left side of the pilot piston 59 in the pilot cylinder 58 is communicated with the secondary side B through a balance port 61 formed through the wall of the pilot cylinder 58 which in turn is communicated through a balance tube 63 with a balance port 62 opened into the secondary side B in the body section 2. Therefore as with the first embodiment, the pressure in the space D' is always equal to the pressure $P_1$ on the primary side A while the pressure in the space C', the pressure $P_2$ on the secondary side B.

As with the case of the first embodiment, when the valve member 3 is pressed against the valve seat 6 or is in the shutoff position, the resultant unbalanced force $F_1$ acts there upon due to the difference in pressure between the primary and secondary sides A and B but due to the same pressure difference the force $F_2$ acts upon the pilot piston 59 to encounter the unbalanced force $F_1$ acting on the valve member 3.

The balance tube 63 intercommunicating the balance ports 61 and 62 has a miniature shutoff valve 65 which is completely closed when the valve is in the closed position so that the leakage from the primary side A through the chamber in the body section 1, the balance port or opening 60 of the pilot cylinder 58, the right side space D' in the pilot cylinder 58, the clearance between the pilot cylinder 58, and the pilot piston 59, the space C' on the left side of the pilot piston 59, the balance tube 63 and the bore of the pilot port 62 into the secondary side B may be positively prevented.

Figure 8:
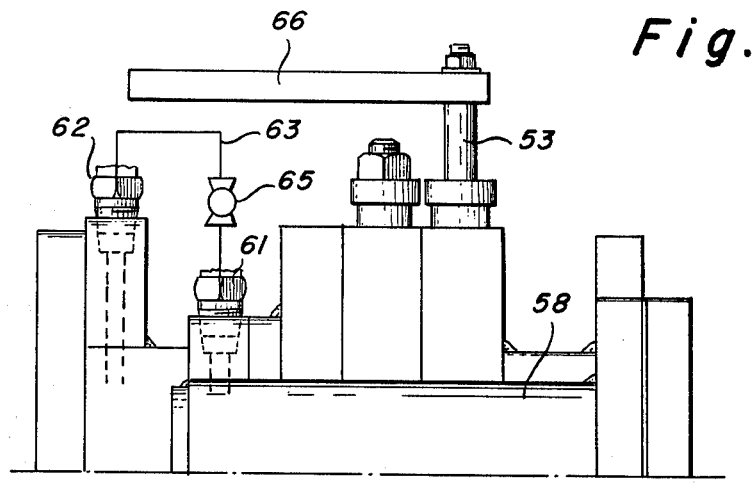
FIG. 8 is a top view thereof.

When the valve of the second embodiment with the above construction is used as a manually operated valve, the pin 53 carrying the driving lever 56 is extended out of the body section 1 as shown in FIG. 8 and is securely fixed to one end of a manually operating lever 66 so that the valve member 3 may be moved toward or away from the valve seat 6 by the manual operation of the lever 66. More particularly, when the lever 66 is swung, the driving lever 56 carried by the pin 53 is also swung together with the follower lever 57 so that the valve member carried by the driving lever 56 and the follower lever 57 is moved toward or away from the valve seat axially or in the liquid flow through the valve. Therefore the valve member 3 is not swung relative to the valve seat 6 so that the precise alignment therebetween may be maintained and consequently the valve member 3 may be precisely seated upon the valve seat 6.

When the pilot piston 59 is displaced by the lever 56 to the left while the valve member 3 is moved away from the valve seat 6 to the wide opened position indicated by the solid lines in FIG. 7, the liquid flows through the valve as indicated by the arrows. When the pilot piston 59 is shifted by the lever 56 to the right while the valve member 3 is pressed against the valve seat 6 or is brought to the shutoff position, the resultant unbalanced force $F_1$ due to the difference in pressure between the primary and secondary sides A and B acts upon the valve member 3. As with the first embodiment described above, this unbalanced force $F_1$ may be suitably encountered in the this embodiment. That is, in this embodiment the arrangement is provided so that the pressure in the space on the right side of the pilot piston 59 in the pilot cylinder 58 may be equal to the pressure $P_1$ on the side of the primary side A while the space on the left side of the pilot piston 59 may be equal to the pressure $P_2$ on the secondary side B. As a result, when the unbalanced force $F_1$ acts on the valve member 3, the force $F_2$ due to the pressure difference between the spaces C' and D' acts on the pilot piston 59 and tends the piston to be displaced toward the left. This force $F_2$ is transmitted through the driving lever 56 to the valve member 3 to encounter the force $F_1$ acting thereon. Therefore only a little power is sufficient to be applied to the operating lever 66 to move the valve member 3 from the shutoff position to the open position. Same is true even when the direction of the liquid flow through the valve is reversed.

Figure 9:
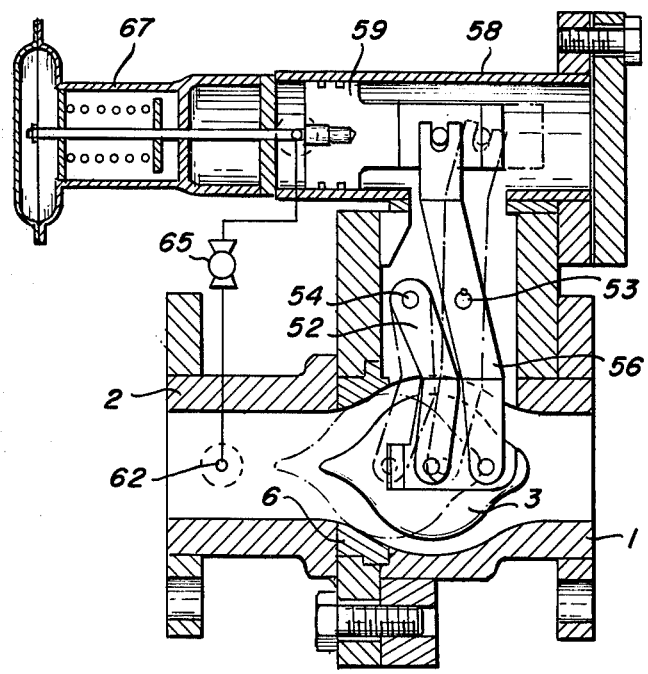
FIG. 9 is a view similar to FIG. 7 but illustrating the valve which is automatically controlled.
Figure 10:
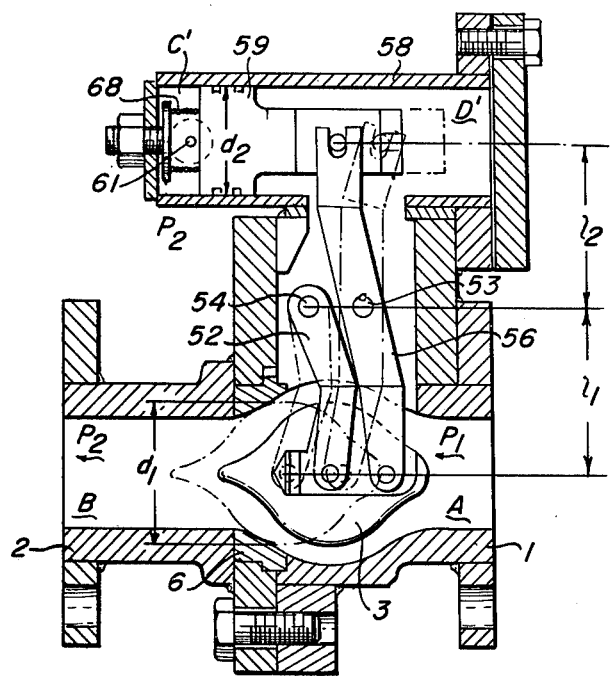
FIG. 10 is a view similar to FIG. 7 but illustrating the valve which is used as an automatic relief valve.

The valve of the second embodiment may be used as an automatic control valve as shown in FIG. 9. A conventional pneumatic, hydraulic or electrohydraulic type valve actuator 67 is operatively connected to the piston 59 of the pilot cylinder 58 to displace the piston 59 to the right or left so that the valve member 3 may be axially moved toward or away from the valve seat 6.

The valve of the second embodiment may be also used as an automatic relief valve or automatic emergency shutoff valve. When used as an automatic relief valve, the diameter $d_2$ of the pilot piston 59 is selected larger than the diameter $d_1$ of the valve while the length $l_1$ of the upper arm of the driving lever 56 is selected longer than the length $l_2$ of the lower arm thereof. In addition, a coiled spring 68 is loaded between the pilot piston 59 and the left end plate of the pilot cylinder 58 so that the setting of the relief valve may be varied.

When the ratio in length between the upper and lower arms of the driving lever 56 is 1 : 1 and when the pressure $P_1$ acting on the right side of the pilot piston 59 is increased as shown below $$P_1 > \frac{P_K}{\frac{\pi}{4}(d_2^2 - d_1^2)}$$

where $P_K$ = force of the spring 68, and friction forces are not taken into account, then the valve member 3 is moved away from the valve seat 6 to the wide open position. Therefore the liquid flows through the valve from the primary side A to the secondary side B. That is, the valve function as a relief valve.

The valve of the second embodiment may be also used as a manually operated emergency relief valve. In this case, the tube interconnecting between the miniature shutoff valve 65 and the balance port 62 opened into the secondary side B is disconnected. In case of an emergency, the valve 65 is opened so that the pressure in the space C' on the left side of the pilot piston 59 may equal the atmospheric pressure. As a result, the pilot piston 59 is forced to be displaced left so that the valve member 3 is moved away from the valve seat 6 and consequently the liquid may flow through the valve.

When used as an emergency shutoff valve, instead of the miniature shutoff valve 65, a three-way cock or three-way solenoid operated valve 69 is used as shown in FIG. 11, and is hydraulically communicated through a balance tube 71 with a balance port 70 opened into the space on the right side of the pilot piston 59 in the pilot cylinder 58. Normally the ports x and y of the three-way cock or valve 69 are opened while the port z is closed, when the valve is opened. In case of an emergency, the ports x and z are opened while the port y is closed so that the primary pressure $P_1$ is admitted through the balance port 70 and the balance tube 71 into the space C' on the left side of the pilot piston 59. As a result, no force acts upon the right side of the pilot piston 59 so that the valve member 3 is pressed against the valve seat 6 under the force of the fluid as well as the force of the biase spring 68. Thus the valve is tightly shut off.

A three-way cock or three-way solenoid operated valve 69 is disposed in the balance port 61 intercommunicating between the other side of said pilot piston C' and the secondary side of the valve 62, and the space D' on one side of said pilot piston 70 is communicated through a balance port 70 with said three-way cock or three-way solenoid operated valve 69, see FIG. 11.

So far the present invention has been described with reference to the accompanying drawings illustrating some illustrative embodiments thereof, but it will be understood that the present invention is not limited thereto and that various modifications can be effected without the true spirit thereof. For instance, an angle body may be used so as to change the direction of the liquid flow by 90°.

The novel features and advantages of the present invention may be summarized as follows;

(i) The valve member is oval-shaped and the body section has a corresponding oval-shaped valve chamber so that the pressure loss in the valve may be considerably minimized. The valve loss coefficient may be reduced to about 1/50 to 1/80 as compared with the conventional single-port valves and is almost equivalent to that when a sluice valve is wide opened.

(ii) Because of the very small valve loss described in (i), the nominal size of the valve may be decreased and accordingly the nominal size of the pipes may be also reduced.

(iii) Since the valve member is oval-shaped, the tight and complete shutoff becomes possible in a very simple manner. Furthermore, the resistance of the valve to the fluid flow is consideraby reduced so that the valves with small sizes may be advantageously used even when the size of the pipe system remains unchanged. Since the valves may be reduced in size, their costs may be also considerably reduced.

(iv) The arm or lever carrying the oval-shaped valve member has a cross sectional configuration similar to that of an air foil, the pressure loss in the valve may be further reduced.

(v) A pilot cylinder is provided in order to encounter the unbalanced force acting on the valve member due to the difference in pressure between the primary or upstream side and the secondary or downstream side. Therefore the valve operating power may be remarkably reduced and the reliable and dependable flow control can be attained irrespective of the direction of the liquid flow through the valve.

(vi) The valves in accordance with the present invention may be manually and/or automatically controlled so that the types and kinds of the valves used in the processing plants or the like may be reduced.

(vii) The valves may be also used as a flowmeter.

(viii) The flow characteristics may be arbitrarilly changed by changing the shape of the valve member.

(ix) In some embodiments, the arm or lever carrying the valve member has a guide projection fitted slidably into the axial guide groove of the body section so that the displacement of the valve member in the lateral direction of the liquid flow can be completely prevented and also the inclination of the valve member can be prevented. As a result, the liquid flows very uniformly through the passage between the valve member and the valve seat.

(x) In the second embodiment, the valve member is carried by the driving lever and the follower lever in such a way that the valve member may be displaced axially or in parallel with the direction of the liquid flow and is not permitted to swing. As a result, the precise alignment between the valve seat and the valve member can be maintained and consequently the completely tight shutoff can be attained.

What is claimed is:

1. A valve for controlling fluid flow comprising a valve body having a chamber, an oval-shaped valve member disposed within said chamber for valve opening and closing operation, said chamber having a configuration corresponding to said oval-shaped valve member and provided with primary and secondary sides at opposite sides of said valve, a pilot cylinder disposed within said valve body, a pilot piston in said pilot cylinder, a connecting member connecting said valve member and pilot piston, said pilot cylinder being provided with spaces on opposite sides of said pilot piston, means connecting one of said spaces with the primary side of said valve and means connecting the other of said spaces with the secondary side of said valve, whereby the unbalanced force acting on the valve member when the valve member is opened or closed in counteracted by the forces acting on said pilot piston by the pressures in said spaces, and wherein a driving lever is supported by a pin carried by the body, opposite ends of said lever being connected with the pilot piston and the valve member respectively, a follower lever pivotally supported in said body and having an end connected with the valve member, whereby the driving lever and the follower lever cooperate to displace the valve member axially.

2. A valve as set forth in claim 1 wherein said pilot cylinder is operatively coupled to a valve actuator, whereby the valve opening and closing operation may be effected automatically.

* * * * *